United States Patent [19]

Rippel et al.

[11] 4,415,963
[45] Nov. 15, 1983

[54] FET COMMUTATED CURRENT-FED INVERTER

[75] Inventors: Wally E. Rippel, Altadena; Dean B. Edwards, Monrovia, both of Calif.

[73] Assignee: California Institute of Technology, Pasadena, Calif.

[21] Appl. No.: 257,478

[22] Filed: Apr. 24, 1981

[51] Int. Cl.³ .......................................... H02M 7/515
[52] U.S. Cl. ..................................... 363/135; 323/266
[58] Field of Search ..................... 307/571; 323/266; 363/22-25, 131-136, 139

[56] References Cited

U.S. PATENT DOCUMENTS

| | | | |
|---|---|---|---|
| 3,222,587 | 12/1965 | Lichowsky | 363/136 X |
| 3,588,667 | 6/1971 | Duss et al. | 363/135 |
| 3,742,330 | 6/1973 | Hodges et al. | 323/266 X |
| 4,256,977 | 3/1981 | Hendrickson | 307/571 |

FOREIGN PATENT DOCUMENTS 570168  8/1977  U.S.S.R. .............................. 363/136

OTHER PUBLICATIONS

IBM Technical Disclosure Bulletin, "Inverter Commutating Network", B. C. Felton & H. P. Meyer, vol. 16, No. 7, Dec. 1973.
Intersil Application Bulletin A035, Switchmode Converter Topologies—Make Them Work for You by Rudy Severns,-pp. 1, 15 and 32, Intersil, Inc., 10710 North Tantau Avenue, Cupertino, CA 95014.

Primary Examiner—William M. Shoop
Attorney, Agent, or Firm—Freilich, Hornbaker, Wasserman, Rosen & Fernandez

[57] ABSTRACT

A shunt switch comprised of a field-effect transistor ($Q_1$) is employed to commutate a current-fed inverter (10) using thyristors (SCR1, SCR2) or bijunction transistors ($Q_2$, $Q_3$) in a full bridge (1, 2, 3, 4) or half bridge (5, 6) and transformer ($T_1$) configuration. In the case of thyristors, a tapped inverter (12) is employed to couple the inverter to a dc source to back bias the thyristors during commutation. Alternatively, a commutation power supply (20) may be employed for that purpse. Diodes ($D_1$, $D_2$) in series with some voltage dropping element (resistor $R_{12}$ or resistors $R_1$, $R_2$ or Zener diodes $D_4$, $D_5$) are connected in parallel with the thyristors in the half bridge and transformer configuration to assure sharing the back bias voltage. A clamp circuit comprised of a winding (18) negatively coupled to the inductor and a diode ($D_3$) return stored energy from the inductor to the power supply for efficient operation with buck or boost mode.

8 Claims, 10 Drawing Figures

FET COMMUTATED CURRENT-FED INVERTER

ORIGIN OF INVENTION

The invention described herein was made in the performance of work under a NASA contract and is subject to the provisions of section 305 of the National Aeronautics and Space Act of 1958, Public Law 85-568 (72 Stat. 435; 42 USC 2457).

BACKGROUND OF THE INVENTION

This invention relates to current-fed inverter topologies and more particularly to the use of a field-effect transistor as a commutator circuit for a current-fed inverter.

Commutator circuits for SCR current-fed inverters are generally complex in that they include snubbers, LC circuits and other commutation components. For example, in a fullwave N-phase bridge circuit using thyristors SCRs or triacs), the thyristors are switched from on to off by first diverting the current through a shunt switch followed by reapplication of voltage when the shunt switch is turned off. That voltage must not exceed a critical rate of rise (dv/dt) or it will switch the thyristor back on, a phenomenon referred to as "forward breakover." Prior to the invention described in a copending application Ser. No. 187,620 filed Sept. 15, 1980, it was the practice to add a snubber (dv/dt control circuit) in parallel with the thyristor. The invention disclosed in that application employs gate-to-drain capacitance of a field-effect transistor (FET) for dv/dt control. That capacitance may be increased with an external capacitor, if required, without adding complexity to the FET commutator circuit. It is thus shown that an effective synergism results when FET and thyristor switches are combined within one topology.

Another type of switching device is the bijunction transistor (BJT) commonly referred to as a bipolar transistor, such as a silicon npn transistor. Compared with the FET, the strong points of the BJT include lower cost per volt-ampere and lower forward drop at full current. In contrast, the FET is superior in terms of speed, ease of drive, ruggedness, and overload capability. Accordingly, any potentially synergistic topology which combine FETs and BJTs should rely on the FET during the switching intervals, for reasons of both speed and ruggedness, while relying on the BJT during non-transient operation for low forward voltage drop.

Compared with the BJT, the SCR offers lower cost per VA, greater peak current capability, higher voltage and current ratings, easier drive and greater ruggedness. Relative weaknesses of the SCR include lack of inherent turn-off capability, limited switching speeds, and an on state voltage drop which is typically higher than BJT saturation voltages.

The question therefore arises whether or not effective synergisms can be realized when either FETs and BJTs or FETs and SCRs are combined in a new topology. A further question is whether or not the dv/dt control philosophy of the basic FET and SCR combination disclosed in the aforesaid copending application can be used to advantage in such new and useful topologies.

SUMMARY OF THE INVENTION

In accordance with the present invention, a new and useful topology for current-fed inverters is comprised of a single FET connected as a shunt switch to interrupt current from a source of dc power through an inductor to an inverter. The inverter is comprised of junction switching devices (where the term "junction switching devices" is defined to include BJTs and thyristors) using either four switching devices in a bridge, where switching devices are turned on and off in pairs selected from opposite sides of the bridge, such that current from the inductor always flows through one device of a pair and is returned through the other device, and the pairs are operated alternately, or two opposing switching devices connected to opposite ends of a center tapped primary winding of a transformer such that current from the inductor alternately flows through the two sides of the primary winding as the devices are operated alternately.

In the case of thyristor switching devices (SCRs or triacs) for the inverter, the FET shunt switch is connected to a tap on the inductor which then serves to provide a commutation power supply for the thyristors, or to a separate commutation power supply in series. Selective turn on and turn off of the thyristor switching devices is achieved by control of their gate drive signals. When turning off a thyristor switching device, its gate drive is removed and simultaneously an appropriate gate pulse is applied to turn on the FET, whereby the thyristors in the inverter are reverse biased by the autotransformer action of the tapped inductor, or a separate commutation power supply, whichever is provided. After a sufficient time interval for the thyristors to be extinguished, the FET is turned off in such a manner that the dv/dt applied to the thyristors under commutation does not exceed the critical breakover limit of the thyristors. During this commutation interval, gate drive is maintained for the opposing thyristor, or thyristors, thereby preventing their unwanted turn off. This turn off of the FET is controlled by the combination of a gated constant current source drive circuit and the gate-to-drain capacitance of the FET, which may be increased by external capacitance of the appropriate size. The FET may also be pulsed on during the turn on of an SCR, thereby reducing turn on losses of power in the SCRs.

In the case of BJT devices in the inverter, no external capacitance is provided for the FET. Instead the FET is switched on and off at high speed to reduce switching losses. In either case, a clamp circuit comprised of a winding negatively coupled to the inductor and a diode is connected in parallel with the inductor and FET, whereby inductor stored energy is returned through the diode to the power source. Efficient operation of the inverter is then possible in the buck mode as well as the boost mode. In the case of thyristors in the inverter comprised of a half bridge and transformer, means are added to force the thyristors to share reverse voltage during commutation. This means may consist of a separate diode and series resistor combination in shunt across each thyristor, or a separate diode and a common series resistor combination in shunt across each thyristor. In either case, separate or common series resistor, the resistor may be replaced with a Zener diode.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 4a illustrates an exemplary embodiment of the invention using thyristor switches in the inverter of FIG. 3, and FIGS. 4b, 4c and 4d illustrate variants of the circuit in FIG. 4a.

DESCRIPTION OF PREFERRED EMBODIMENTS

Figure 1:
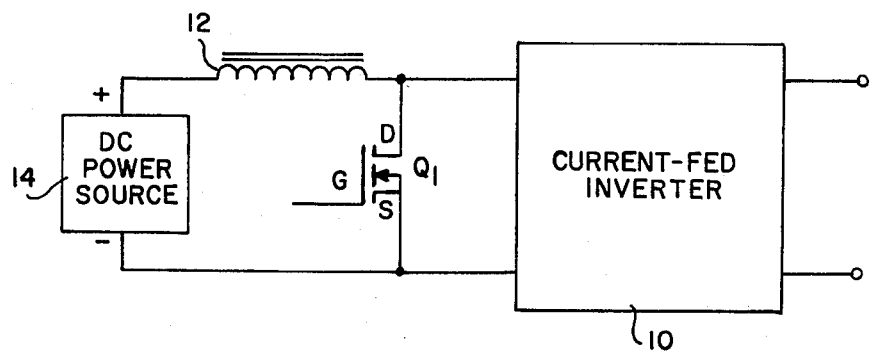
FIG. 1 is a diagram which illustrates the basic topology of the present invention for a current-fed inverter.
Figure 2:
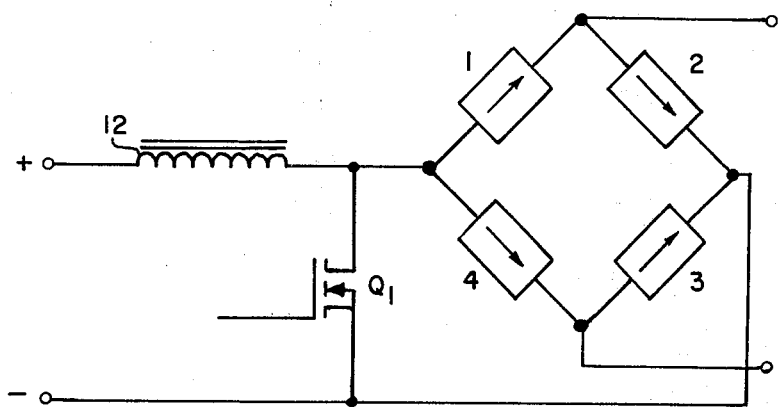
FIG. 2 illustrates the basic topology of FIG. 1 with four switches in a bridge circuit for the inverter.
Figure 3:
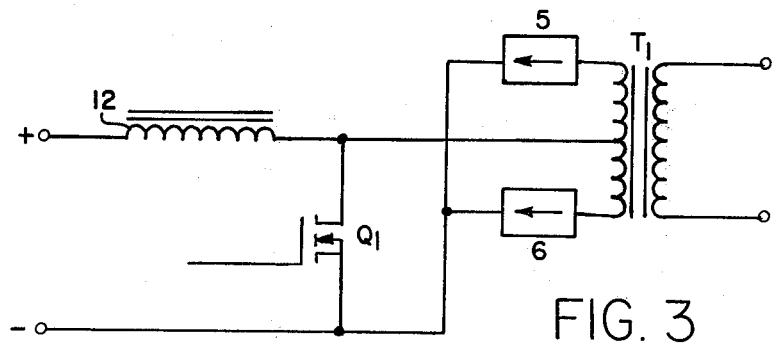
FIG. 3 illustrates the basic topology of FIG. 1 with a half bridge and center tapped transformer combination for the inverter.

Referring now to FIG. 1, a new and useful arrangement for commutating switches in a current-fed inverter 10 is comprised of an inductor 12 connected in series with a dc power source 14, and a field-effect transistor (FET) $Q_1$ connected to shunt current from the inverter while commutating inverter switches. The inverter switches may be arranged in a bridge circuit as shown by switches 1 through 4 in FIG. 2, or in a half bridge and center tapped transformer $T_1$, as shown by switches 5 and 6 in FIG. 3. These switches may be thyristors, such as SCR1 and SCR2 shown in FIG. 4a, in which case the FET is connected to a tap in the inductor 12 in order to provide back bias voltage for the SCRs during turn-off commutation by autotransformer action of the inductor. This back bias voltage is necessary for commutating an SCR since removal of its gate drive will not alone extinguish (turn off) the SCR. Alternatively, these switches may be bijunction transistors, such as the npn power transistors $Q_2$ and $Q_3$ shown in FIG. 5, in which case the FET is connected to the output of the inductor, as shown in FIG. 1, and not to a tap.

Figure 4A:
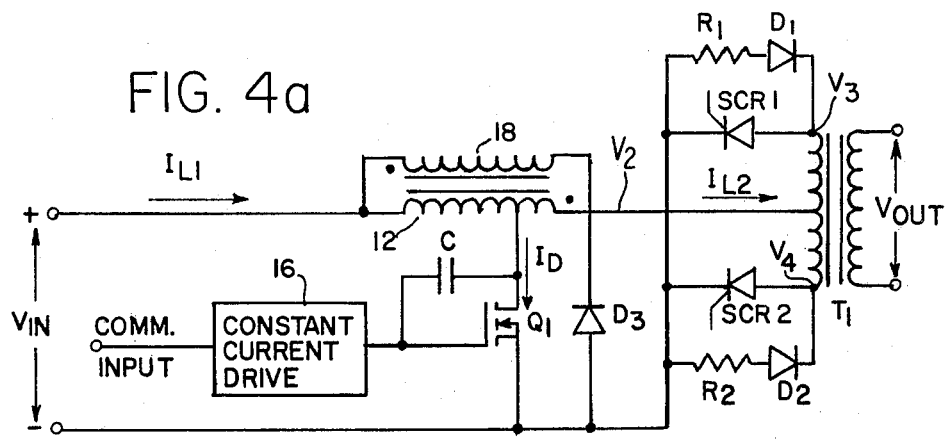

When the FET is turned on by a gated constant current source 16 to interrupt the SCR current in the circuit of FIG. 4a, it is necessary to control the dv/dt reapplied to the SCRs when the FET is turned off. Otherwise "forward breakover" may occur. SCR1 and SCR2 are alternatively gated on with controlled overlap as shown by waveforms a and b in FIG. 6. Turn off of each SCR is achieved by simultaneously removing its gate drive and applying an FET gate pulse, shown in waveform c of FIG. 6, to the gate of the FET. Thus, at the start of turn-off commutation, the FET is turned on, whereby both SCRs are reverse biased by autotransformer action of the inductor 12. Gate drive is maintained for the other SCR, thus preventing it from being turned off. After a sufficient time interval the FET is turned off, but in a controlled dv/dt manner such that the dv/dt applied to the SCR under commutation does not exceed its forward breakover limit.

Figure 6:
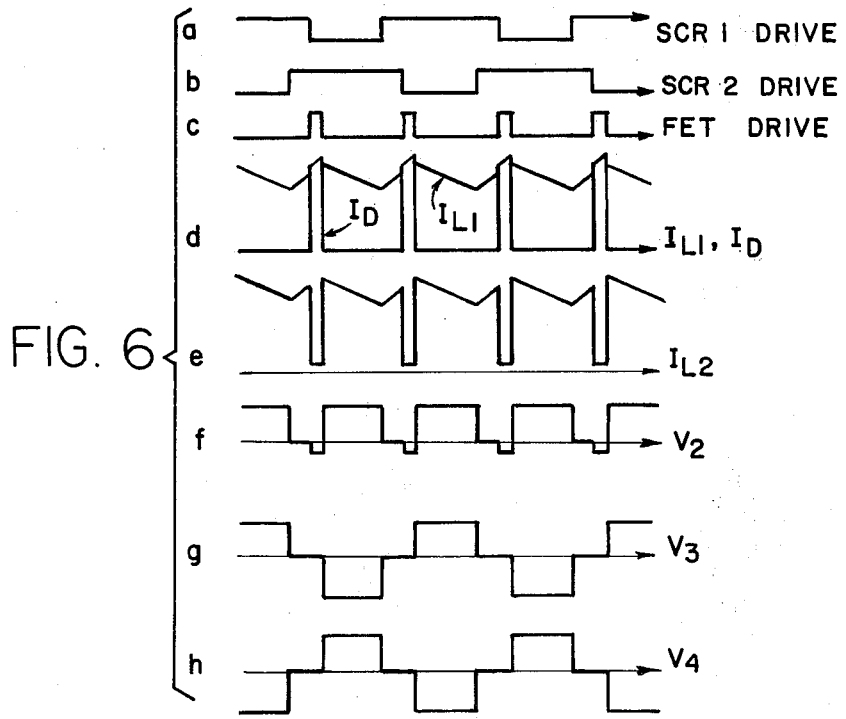
FIG. 6 is a waveform timing diagram useful in understanding the operation of the FIG. 4 embodiments of the present invention.

Waveform d of FIG. 6 shows the current into the inductor 12, which peaks while the FET is on. Waveform e then shows the current out of the inductor to the inverter switches, which drops to zero while the FET is on. Waveform f shows the voltage $V_2$ at the center tap of the primary winding of the transformer, which goes to zero during the overlapping period of the SCRs, and goes to a slightly negative level during the switching times (waveform c) that the FET is turned on to reverse bias both SCRs. This negative bias voltage affects only the SCR being commutated off by its gate drive being simultaneously removed (waveforms a and b). The results are alternating voltage pulses $V_3$ and $V_4$ (shown in waveforms g and h) the widths and amplitudes of which are controlled by control of the SCR overlap (overlap of waveforms a and b).

The dv/dt of the FET is dynamically controlled by its gate-to-drain capacitance. That capacitance is either designed into the device, or is provided by an external capacitor, C, or is comprised of both internal and external capacitance. The FET itself thus performs the role of snubbing (dv/dt control) upon commutating an SCR, thereby eliminating the need for a conventional snubber. That is the object of the aforesaid copending application and is not per se an invention in this application.

Since the FET is an active component, dv/dt values may be maintained constant and independent of load current. This in turn enables snubbing losses to be minimized for all values of load current while protecting the SCRs from critical dv/dt. The result is a lightweight, low cost, rugged and efficient current-fed inverter in which the inverter currents are shunted by the FET during switching intervals. Other advantages are that the SCR cathodes and the FET source are each common to the drive circuit ground. Furthermore, a misfire of either SCR will not interrupt subsequent circuit action, and transformer saturation during transient conditions is not a problem.

Figure 4B:
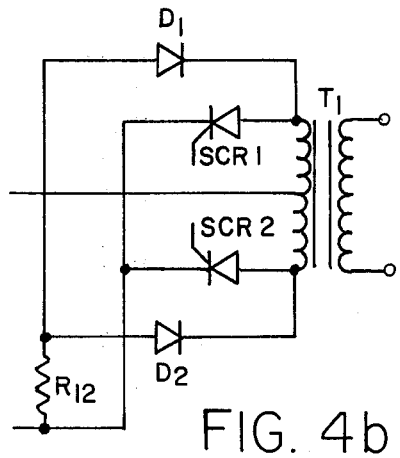
Figure 4C:
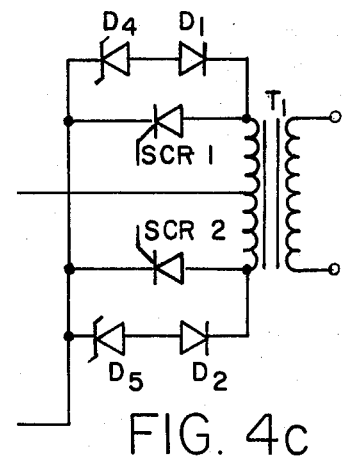

Additions to the circuit of FIG. 4a thus far described are required to force the SCRs to share reverse voltage during commutation. A simple and efficient means for achieving this is comprised of a separate resistor ($R_1$, $R_2$) and series diode ($D_1$, $D_2$) in parallel with each SCR. The diode is connected with its cathode at the node between the anode of the SCR and the primary winding of the transformer. Reverse voltage will cause each of the diodes to conduct to provide a reverse bias voltage across its series connected resistor. Otherwise all of the reverse voltage might be forced through one of the SCRs, the one not being commutated off, resulting in possible failure to turn the other off. A variation of this means for forcing the SCRs to share reverse voltage during commutation is the use of single resistor $R_{12}$ in series with each of the two diodes $D_1$ and $D_2$, as shown in FIG. 4b. In either case, the resistance of the voltage balancing network may be provided by a Zener diode in place of the series resistor, as shown by diodes $D_4$ and $D_5$ for the case of separate series resistors in FIG. 4c. The resistor $R_{12}$ in the variant of FIG. 4b could also be replaced by a Zener diode in the other case.

Another addition also illustrated in FIG. 4a is a clamp winding 18 negatively coupled to the inductor 12 and a diode $D_3$. This clamp winding and diode are connected in series between the source of power supply and circuit ground for shut down and fault clearing without the removal of $V_{in}$. Energy stored in the inductor after shutdown is returned through the diode $D_3$ to the power source. With this clamp circuit, the inverter may be used in both the buck and the boost modes. Otherwise, the arrangement of FIG. 4a could only operate in the boost mode.

Figure 4D:
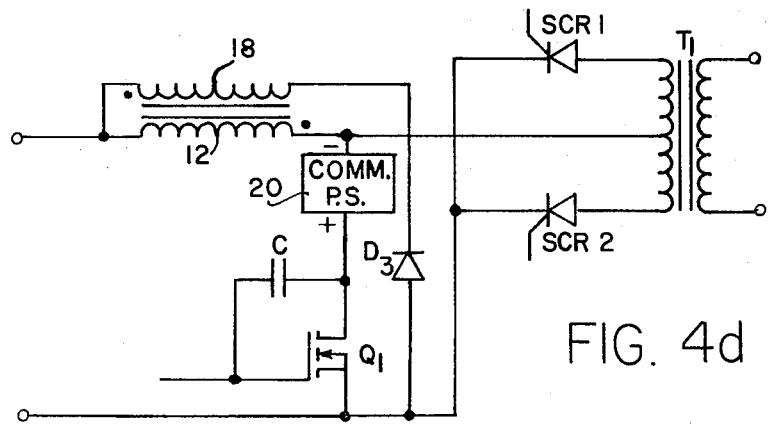
Figure 5:
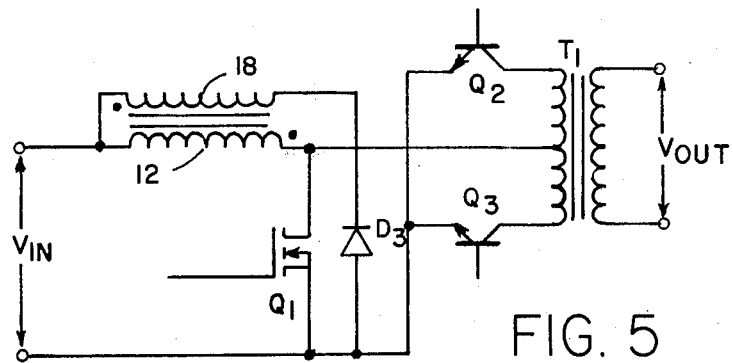
FIG. 5 illustrates an exemplary embodiment of the invention using BJT switches in the inverter of FIG. 3.

Numerous variations of the arrangement shown in FIG. 4a may be employed. For example, a separate commutation power supply may be provided, instead of the tap on the inductor 12, as shown in FIG. 4d by a power supply 20. As another example of a variation, consider that a full SCR bridge inverter may be used in place of the half bridge and transformer. This equivalence is illustrated by generic FIGS. 2 and 3 which are also intended to include the possibility of using bijunction transistors $Q_2$ and $Q_3$ in place of SCRs, as shown in FIG. 5. Note that in the case of a full SCR bridge, the inverter does not require any additional circuits. Still another variation is to pulse the FET on for a few microseconds during the turn on of either of the SCRs in order to reduce turn on losses in a manner analogous to the way turn off losses are reduced by pulsing the FET on during the turn off of either of the SCRs.

Figure 7:
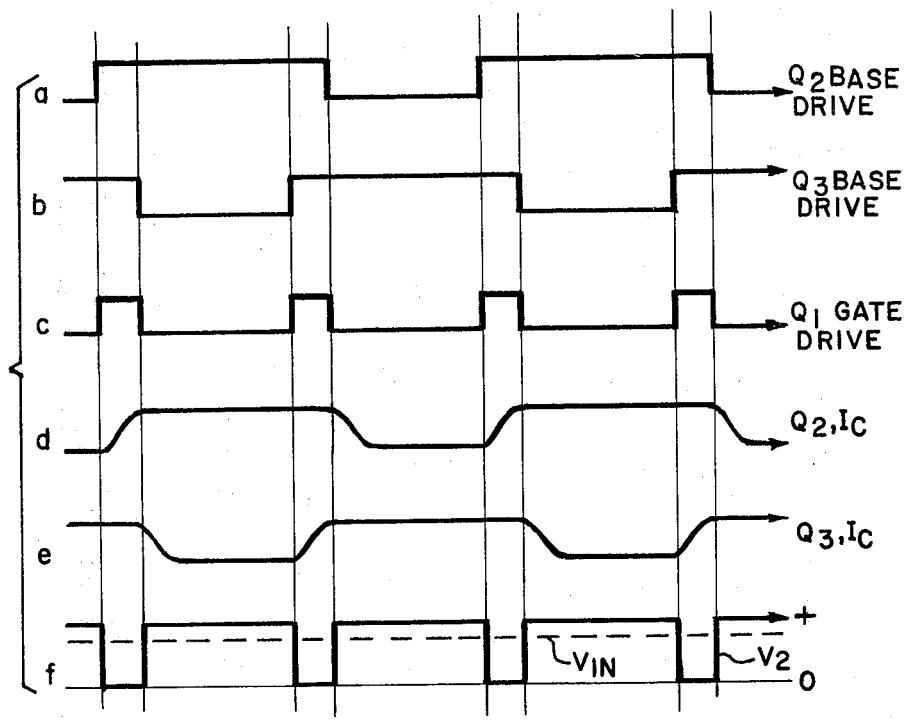
FIG. 7 is a waveform timing diagram useful in understanding the operation of the FIG. 5 embodiment of the present invention.

Operation of the embodiment shown in FIG. 5 is very much the same as for the embodiments of FIG. 4. There is a controlled overlap in the base drive currents of the transistors, as shown in waveforms a and b of FIG. 7. The FET drive is turned on during the overlap, as shown by waveform c. The collector currents of the BJTs are then shown in waveforms d and e. Note that the voltage output shown in waveform f goes to zero during the FET on time.

The rounded corners in the waveforms for the collector currents of the transistors $Q_2$ and $Q_3$ represent switching losses during turn-on and turn-off. By shunting the currents through the FET, which has a very fast switching action very close to that represented by the ideal waveform e, those losses are significantly reduced. Waveform f, which represents the output voltage, is thus more efficiently produced for an inverter of low cost. The arrangement relies upon the low forward voltage drop of the transistors $Q_2$ and $Q_3$ during non-transient operation, and relies upon the high speed and ruggedness of the FET during the switching intervals.

Although particular embodiments of the invention have been described and illustrated herein, it is recognized that modifications and variations may readily occur to those skilled in the art. For example, triacs may be employed for the thyristors in place of SCRs for some applications, particularly in a full bridge arrangement. Consequently, it is intended that the claims be interpreted to cover such modifications and equivalents.

What is claimed is:

1. In a current-fed inverter an improvement comprised of a tapped inductor for connecting a dc source of power to said inverter and a field-effect transistor having source, drain and gate electrodes connected with its source and drain electrodes to bypass output current from said inductor to said dc source while a switch in said inverter is being turned off and another switch is being turned on, wherein said inverter switches are thyristors and said field-effect transistor is connected to said tap in said inductor, thereby providing an autotransformer for back biasing said thyristors while said field-effect transistor is commutating said thyristors, and wherein an external capacitor is connected between said drain and gate electrodes of said field-effect transistor, and where turn on and turn off drive to said field-effect transistor is provided by a gated constant current source connected to said gate electrode.

2. An improvement as defined in claim 1 including means for forcing said thyristors to share reverse voltage during commutation.

3. An improvement as defined in claim 2 wherein said means is comprised of a separate clamping diode connected in series with means for developing a thyristor back biasing voltage in response to current through said clamping diode, said clamping diode and means for developing a voltage for each thyristor being connected in shunt with its thyristor.

4. An improvement as defined in claim 3 wherein said means for developing a voltage is common to both diodes.

5. An improvement as defined in claim 3 wherein said means for developing a voltage is separate for each diode.

6. An improvement as defined in claim 4 or 5 wherein said means for developing a voltage is comprised of one or two resistors.

7. An improvement as defined in claim 4 or 5 wherein said means for developing a voltage is comprised of one or two Zener diodes.

8. In a current-fed inverter an improvement comprised of a tapped inductor for connecting a dc source of power to said inverter and a field-effect transistor having source, drain and gate electrodes connected with its source and drain electrodes to bypass output current from said inductor to said dc source while a switch in said inverter is being turned off and another switch is being turned on, wherein said inverter switches are thyristors and said field-effect transistor is connected to said tap in said inductor, thereby providing an autotransformer for back biasing said thyristors while said field-effect transistor is commutating said thyristors, and wherein an external capacitor is connected between said drain and gate electrodes of said field-effect transistor, wherein a commutation power supply is connected in series between said field-effect transistor and said inductor, the polarity of said commutation power supply being reversed from the voltage applied to said thyristors from said inductor, thereby back biasing said thyristors when said field-effect transistor is turned on to commutate said thyristors.

* * * * *